US00RE40733E

(19) United States
(12) Reissued Patent
Li et al.

(10) Patent Number: US RE40,733 E
(45) Date of Reissued Patent: Jun. 16, 2009

(54) HELICAL ELECTRODEIONIZATION APPARATUS

(75) Inventors: Xiang Li, Huzhou (CN); Gou-Lin Luo, Huzhou (CN)

(73) Assignee: Zhejiang Omex Environmental Engineering Ltd., Zheijiang (CN)

(21) Appl. No.: 10/359,060
(22) Filed: Feb. 5, 2003

Related U.S. Patent Documents

Reissue of:
(64) Patent No.: 6,190,528
Issued: Feb. 20, 2001
Appl. No.: 09/266,995
Filed: Mar. 12, 1999

(30) Foreign Application Priority Data

May 19, 1998 (CN) ..... 98 2 23514.3
Nov. 17, 1998 (CN) ..... 98 2 25671.X

(51) Int. Cl.
*B01D 61/48* (2006.01)

(52) U.S. Cl. ..... 204/632; 204/633
(58) Field of Classification Search ..... 204/632, 204/633
See application file for complete search history.

(56) References Cited

U.S. PATENT DOCUMENTS

| | | | | |
|---|---|---|---|---|
| 4,225,413 | A | 9/1980 | Karn | |
| 4,753,681 | A | 6/1988 | Giuffrida et al. | |
| 5,147,722 | A | 9/1992 | Koslow | |
| 5,259,936 | A | 11/1993 | Ganzi | |
| 5,292,422 | A | 3/1994 | Liang et al. | |
| 5,308,466 | A | 5/1994 | Ganzi et al. | |
| 5,316,637 | A | 5/1994 | Ganzi et al. | |
| 5,376,253 | A | * 12/1994 | Rychen et al. | 204/632 |
| 5,425,858 | A | 6/1995 | Farmer | |
| 5,858,191 | A | 1/1999 | DiMascio et al. | |
| 5,868,915 | A | 2/1999 | Ganzi et al. | |
| 5,925,255 | A | 7/1999 | Mukhopadhyay | |
| 5,954,937 | A | 9/1999 | Farmer | |
| 6,193,869 | B1 | 2/2001 | Towe et al. | |
| 6,284,117 | B1 | 9/2001 | Smolko et al. | |
| 6,284,124 | B1 | 9/2001 | DiMascio et al. | |
| 6,309,532 | B1 | 10/2001 | Tran et al. | |
| 6,312,577 | B1 | 11/2001 | Ganzi et al. | |
| 6,328,896 | B1 | 12/2001 | Atnoor et al. | |
| 6,398,965 | B1 | 6/2002 | Arba et al. | |
| 6,436,264 | B1 | 8/2002 | Tamura | |
| 2002/0011413 | A1 | 1/2002 | DiMascio et al. | |

FOREIGN PATENT DOCUMENTS

| | | |
|---|---|---|
| EP | 0 384 716 A2 | 8/1990 |
| EP | 0 660 747 B1 | 7/1995 |
| EP | 0 892 677 B1 | 1/1999 |
| WO | WO 94/06548 | 3/1994 |
| WO | WO 95/32803 | 12/1995 |
| WO | WO 97/28889 | 8/1997 |
| WO | WO 98/11987 | 3/1998 |
| WO | WO 98/20972 | 5/1998 |
| WO | WO 99/50184 | 10/1999 |
| WO | WO 00/44477 | 8/2000 |
| WO | WO 02/14224 A1 | 2/2002 |

* cited by examiner

*Primary Examiner*—Arun S Phasge
(74) *Attorney, Agent, or Firm*—Butzel Long

(57) ABSTRACT

A helical electrodeionization apparatus is adapted to purify aqueous liquids to effect the production of high purity water. An insulated net-separating wall is positioned between a pair of anion and cation exchange membranes to form a special membrane bag type flow unit I, each flow unit I is linked up with a group of slots on the side walls of central pipe, and is rolled up to form cylinder structure which centers on central pipe as the helical axis, a conductive crust is formed by winding metal strip or wire outside the cylinder. Ion exchange resin is filled up between the adjacent membrane bags to form flow unit II. The present invention has less pressure drop and needs less power, and is suited to multiple-device series operation. Preferably, daily maintenance and renewal of the resin is convenient, and production cost is lower.

32 Claims, 4 Drawing Sheets

HELICAL ELECTRODEIONIZATION APPARATUS

Matter enclosed in heavy brackets [ ] appears in the original patent but forms no part of this reissue specification; matter printed in italics indicates the additions made by reissue.

FIELD OF THE INVENTION

This invention relates to novel electrodeionization apparatus adapted to transfer ions in a liquid under the influence of an electrical field. More specifically, this invention relates to a helical electrodeionization apparatus adapted to purify aqueous liquids to effect the production of high purity water.

BACKGROUND OF THE INVENTION

Many techniques have been used to purify and isolate liquids or to obtain concentrated pools of specific ions or molecules from a liquid mixture, such as electrodialysis, liquid chromatography, membrane filtration and ion exchange, etc. At present, a well known process is electrodeionization (EDI). We also call it CDI (continuous deionization).

The first apparatus and method for treating liquids by electrodeionization was described by Kollsman in U.S. Pat. Nos. 2,689,826 and 2,815,320. Improved and advanced electrodeionization systems have been shown in U.S. Pat. Nos. 4,925,541, 4,931,160 and 5,316,637.

The typical structure of above-mentioned electrodeionization module is like a stacked mechanical sheet type, namely ion exchange membrane, separating wall and electrodes are processed to form a rectangle, and packed in sequence, ion exchange resin is filled up, and then is pressed to form a whole with mechanical method. It is difficult to maintain and clean the apparatus, especially one has to take apart the assembly to fill or renew the ion exchange resin. In general it needs special resin like fibre shape resin; moreover the water gathering structure of depletion compartment is more complex to process and it is easy to bring about leaking in the inner part of concentration compartments and depletion compartments.

OBJECTS OF THE INVENTION

The present invention provides a helical electrodeionization apparatus for producing highly purified water. It is a technical improvement to the above-mentioned stacked mechanical sheet type.

In one aspect, the present invention has a simple structure. It is easy to process.

In another aspect, the present invention has no special requirement for ion exchange resin. It is convenient to renew and supplement.

In yet another aspect, the present invention allows solution stream to flow smoothly when it is used. It has less of pressure drop and no leaking in operation.

SUMMARY OF THE INVENTION

This present invention provides an apparatus for producing highly purified water. The technical scheme to realize the present invention is the following:

The apparatus includes anion exchange membrane and cation exchange membrane, central pipe, main component parts, outer crust and cover.

The central pipe is a metal pipe to act as an electrode and also as water distributing and gathering pipe or water gathering pipe.

The main component parts of said apparatus which has a helical cylinder structure, with the central pipe as the helical axis. One or more than one set(s) of rolled membrane bag(s) that are formed by positioning a net-separating wall between a pair cf anion exchange membrane and cation exchange membrane is rolled up to form the cylinder structure; then twin metal strip or metal wire is wound the outside of said cylinder structure to constitute a conductive crust, so that the conductive crust can be used as another electrode.

The membrane bag(s) fits tightly to the central pipe along the axial direction so that the flow passage is communicating with the central pipe through the slotted aperture(s). Fill the ion exchange resin between the adjacent membrane bag(s) to form the flow passage for getting product water.

The structure of the present invention is much simpler, and it is suited to multiple-device series operation. Besides, daily maintenance and renewal of the resin is also more convenient than prior art.

These and other features, aspects, and advantages of the present invention will be better understood from the following drawings, description and appended claims.

DETAILED DESCRIPTION OF THE PREFERRED EMBODIMENTS

Figure 1:
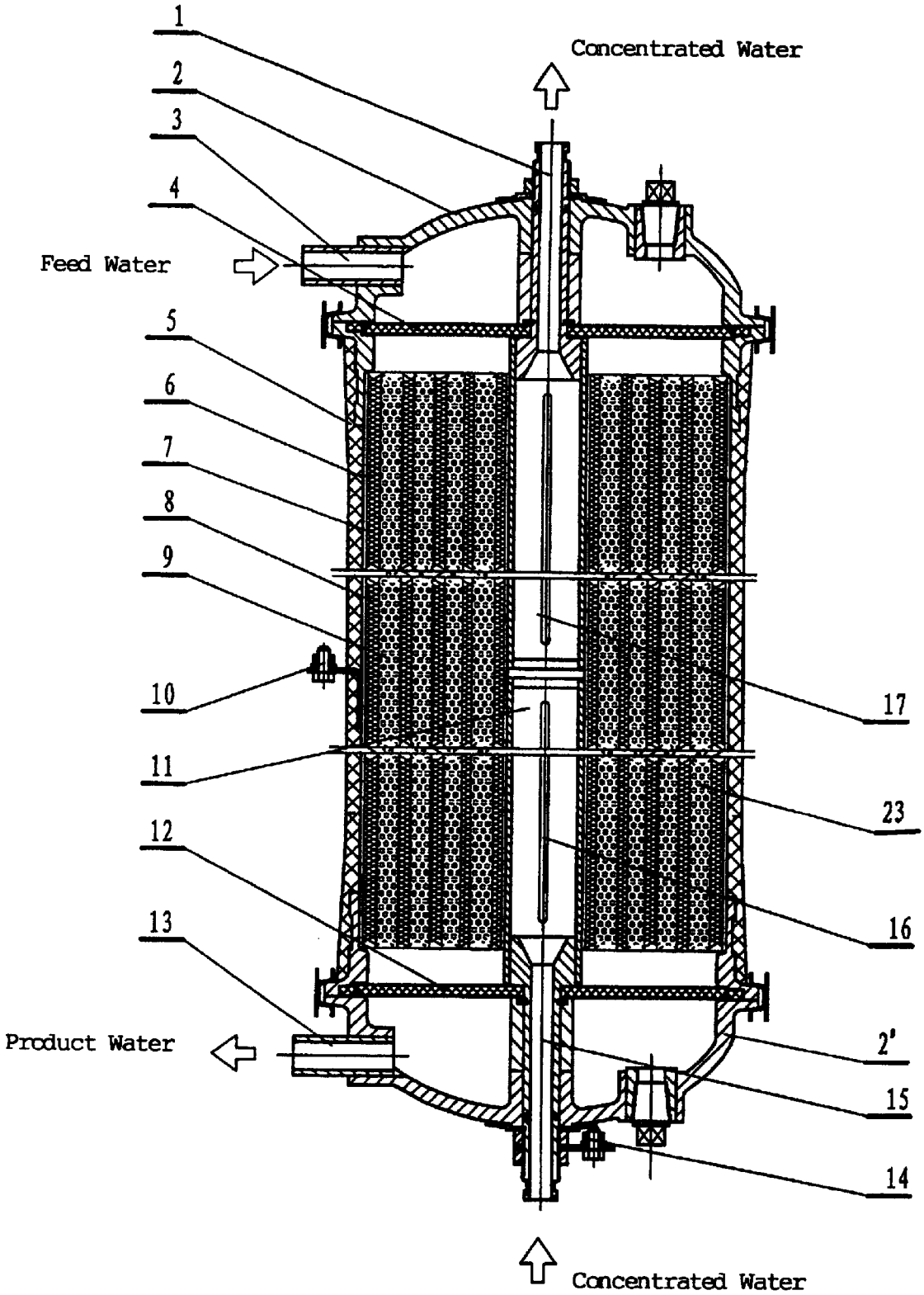
FIG. 1 is a sectional schematic view of the general structure of the present invention.
Figure 2:
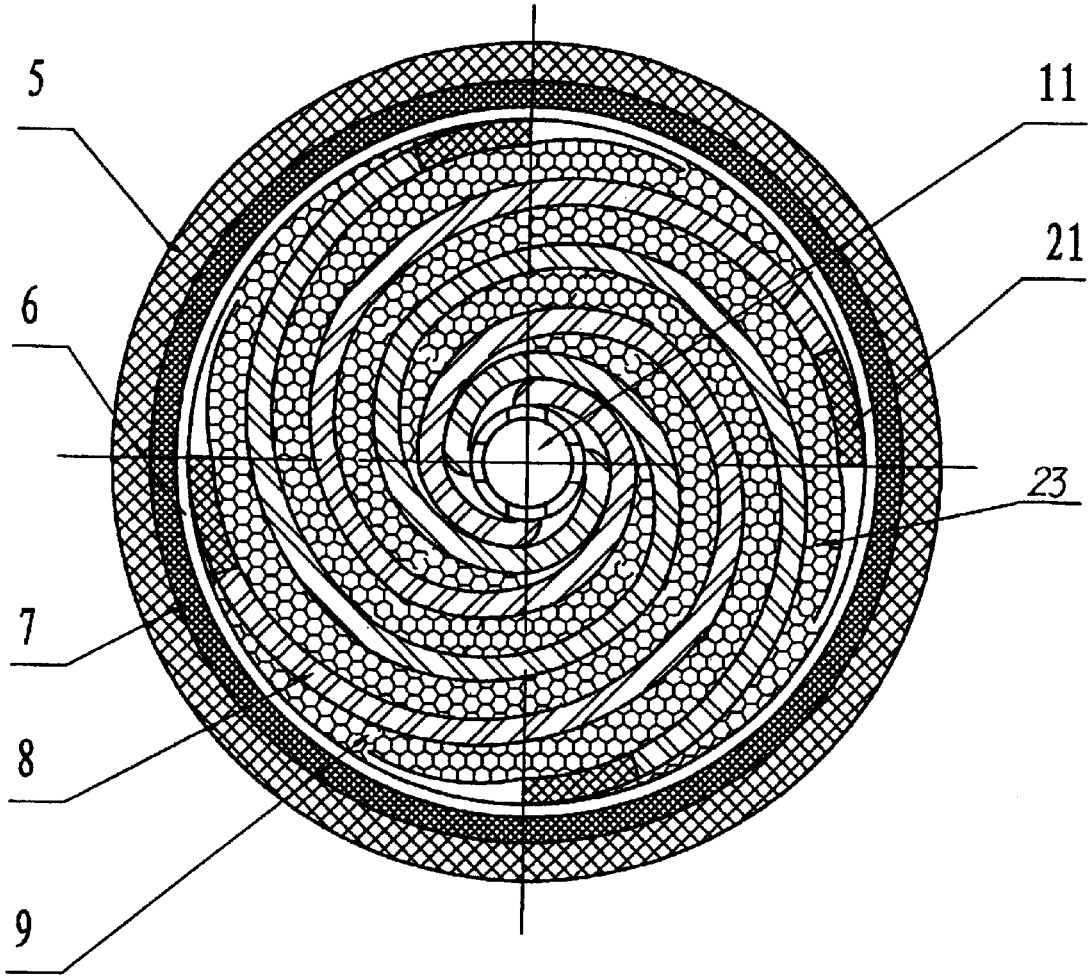
FIG. 2 is a schematic view of the cross-sectional structure of the present invention.
Figure 3:
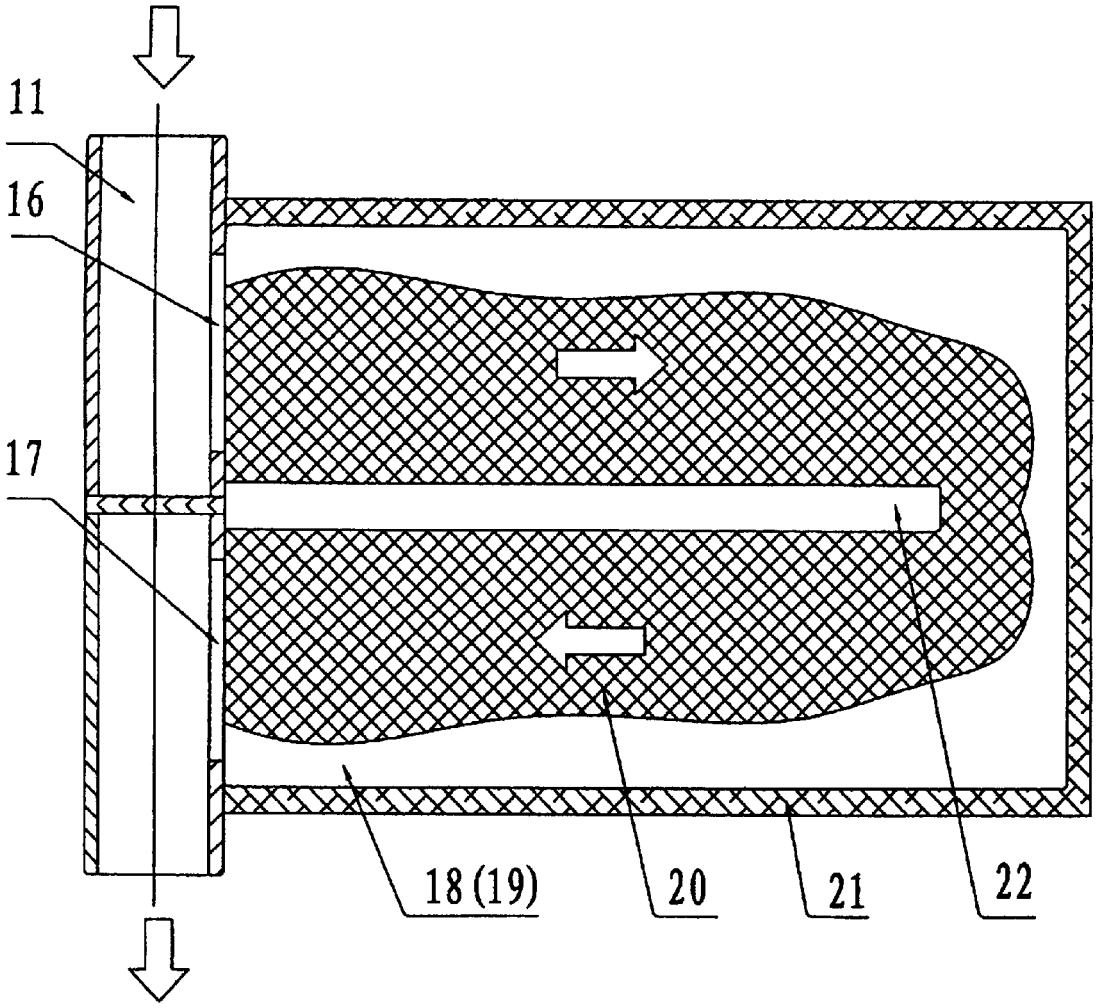
FIG. 3 is a schematic diagram of the structure of the flow unit I of the present invention.

Definition of the drawing's mark number:

1—outlet
2,2'—cover
3—inlet
4—water distributing board
5—outer crust
6—conductive crust
7—insulated filler
8—flow unit I
9—flow unit II
10—anode
11—central pipe
12—water gathering board
13—outlet
14—cathode
15—inlet
16—water distributing aperture
17—water gathering aperture
18—anion exchange membrance
19—cation exchange membrance
20—insulated net-separating wall
21—sealing edge
22—guide band Referring to FIG. 1, FIG. 2 and FIG. 3, the central pipe 11 is a metal pipe, for distributing and gathering water. It is blocked in the middle. The upper half part is water gathering pipe, in which side wall, water gathering aperture 17 is slotted. The lower half part is water distributing pipe, in which side wall, water distributing aperture 16 is slotted. Each set of water distributing and gathering apertures are slotted on the same axial line;

The flow unit I 8 is an U-shape flow passage in a membrane bag structure (shown in FIG. 3): an anion exchange membrane 18 and a cation exchange membrane 19 build up a membrane bag. Three sides of said anion exchange membrane 18 and cation exchange membrane 19 are sealed by sealing edge 21, the other side is opening. An insulated net-separating wall 20 is in the membrane bag, namely between of said anion exchange membrane 18 and cation exchange membrane 19. A guide band 22 is positioned on the middle of said insulated net-separating wall 20 and kept fitting closely to the inner wall of the membrane bag to form the U-shape flow passage.

The opening side of the membrane bag fits tightly to the central pipe 11 along the axial direction, meanwhile the two terminal of the U-shape flow passage is linked up with water distributing aperture 16 and water gathering aperture 17, respectively.

One or more membrane bags are rolled up to form a cylinder structure which centers on central pipe 11 as the helical axis, according to the requirement of the product capacity. FIG. 2 shows a cylinder structure formed by four membrane bags. A conductive crust 6 is composed of metal strip or metal wire twined round the outside of said main component parts. The conductive crust 6 is used as an electrode. Ion exchange resin *23* is filled up between the adjacent membrane bags in the [conductive] *outer* crust [6] *5* to form flow unit II 9.

The assembly mentioned above includes the main component parts of the present invention.

The main component parts are assembled in outer crust 5 with shell covers 2 at two terminals, outlet 1 and feed water inlet 3 are positioned at cover 2, inlet 15 and outlet 13 are positioned at the other cover 2', anode 10 and cathode 14 which are linked up with conductive crust 6 and central pipe 11 respectively are positioned on the outer crust 5.

Insulated filler 7 is lined between outer crust 5 and conductive crust 6.

Water distributing board 4 and water gathering board 12 are lined between the shell covers 2,2' and the cylinder structure; namely to construct the whole present invention.

In operation, pretreated water influx via the feed water inlet 3, through the flow unit II 9, and de-ionized water efflux through the outlet 13, that's the product water; concentrated water can be circulated, entering the apparatus from the inlet 15, passing through the flow unit I 8, and outgoing through the outlet 1.

To renew the ion exchange resin, remove the covers 2 and 2', water distributing board 4 and water gathering board 12, feed water in the inlet 3 to thrust the ion exchange resin; then fill the new ion exchange resin. There is no special requirement for the ion exchange resin, even the general particle-type ion exchange resin.

According to the specification of the fed water, one apparatus of this invention can produce 1~2 T namely 1000~2000 liters high purity water per hour, while deionization ratio at 95%~99%, power 0.3~1.0 kw/h/T and utilization ratio of water 90%~95%. For example, if the conductivity of fed water is 10 μs/cm, we can get the product water 1500 liters per hour and its conductivity is only 0.1 μs/cm. (see Table 1)

TABLE 1

| Feed water | Product water | Output capacity | Power | Utilization ratio of water |
|---|---|---|---|---|
| 10 μm/cm | 0.1 μm/cm | 1500 L/h | 0.8 kw/h | >95% |

Said apparatus of this invention is suitable to process the pretreated water, such as the conductivity of water being lower than 500 μs/cm, especially lower than 100 μs/cm.

Said apparatus of this invention has exchangeability, namely you can change the fed water inlet for the product water outlet to meet your needs.

Said apparatus of this invention can be used in series, one stage or multi-stage.

Figure 4:
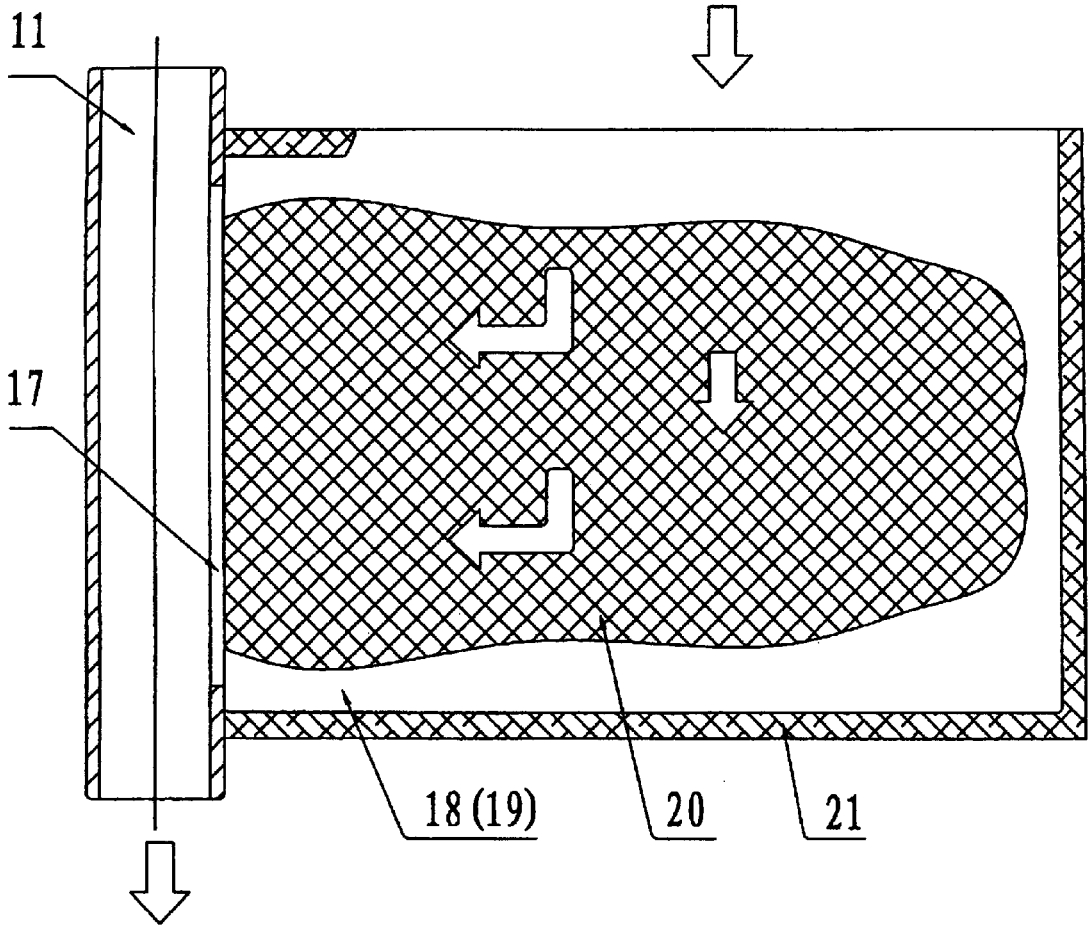
FIG. 4 is a schematic diagram of another different structure of the flow unit I of the present invention.

FIG. 4 presents another different structure of the flow unit I of the present invention. The flow unit I 8 may also be designed to become another structure: an anion exchange membrane 18 and a cation exchange membrane 19 build up a membrane bag. An insulated net-separating wall 20 is in the membrane bag, namely between of said anion exchange membrane 18 and cation exchange membrane 19. Two sides of said anion exchange membrane 18 and cation exchange membrane 19 are sealed by sealing edge 21; the third side is opening, whole or partial, as the entrance of concentrated water; the last side of the membrane bag fits tightly to the central pipe 11 along the axial direction, so that the flow unit I linked with water gathering aperture 17.

Feed water enters the membrane bag through the opening side directly as the same time as through the ion exchange resin, then the water through the membrane bag flows into the central pipe 11 via water gathering aperture 17, and exits; the others pass through the ion exchange resin to be the product water. Therefore, only one feed water inlet is needed to be positioned at one cover of the outer crust 5. Product water outlet and concentrated water outlet are positioned at the other cover of the outer crust 5. The remaining structure is the same as mentioned above. Thus the structure is much simpler, but concentrated water cannot be used in circulation.

In short, we can find these advantages of the present invention as the following:

i. The structure of the present invention is much simpler, water flows smoothly in each flow unit and meets with less pressure drop and needs less power, in particular, it is suited to multiple-device series operation;

ii. It is not necessary to use expensive woven-type special ion exchange resin, but a general particle-type ion exchange resin can be used, and so production cost is lower;

iii. Besides, daily maintenance and renewal of the resin is also more convenient than the prior art.

The present invention has been described in considerable detail with reference to certain preferred versions thereof, however other versions are possible. Therefore the spirit and scope of the appended claims should not be limited to the description of the preferred versions contained herein.

We claim:

1. A helical electrodeionization apparatus which comprises an anion exchange membrane (18) and a cation exchange membrane (19), a central pipe (11), a plurality of main component parts, an outer crust (5) and covers(2,2'), wherein:

said central pipe (11) is a metal pipe that acts as an electrode and also as a water distributing or gathering pipe;

said main component parts of said apparatus, which have a helical cylinder structure with said central pipe (11) as the helical axis, further comprising:

i. at least one set of rolled membrane bags that are formed by positioning a net-separating wall (20)

between an anion exchange membrane (18) and a cation exchange membrane (19), ii. metal strip or metal wire twined round the outside of said cylinder structure which forms a conductive crust, said conductive crust being used as another electrode;

a first flow unit (8) of said main component parts, including the flow passage in said membrane bag being fitted tightly and communicating with said central pipe (11) along the axial direction; and a second flow unit (9) of said main component parts, including the flow passage between said adjacent membrane bags being formed by filling ion exchange resin.

2. The apparatus of claim 1, wherein said central pipe (11) is blocked in the middle, the upper half part operating as a water gathering pipe which has water gathering aperture (17) slotted in a side wall; the lower half part operating as a water distributing pipe which has water distributing aperture (16) slotted in the side wall; each set of water distributing and gathering aperture (16,17) being slotted on the same axial line.

3. The apparatus of claim 1, wherein said first flow unit (8) has a U-shape flow passage which is comprised of an anion exchange membrane (18) and a cation exchange membrane (19), three sides of said anion exchange membrane (18) and cation exchange membrane (19) sealed by sealing edge (21) to form a membrane bag structure, the other side opening; an insulated net-separating wall (20) being in the membrane bag, between said anion exchange membrane (18) and said cation exchange membrane (19), a guide band (22) positioned on the middle of said insulated net-separating wall (20) and kept fitting closely to the inner wall of said membrane bag to form the U-shape flow passage; the opening side of said membrane bag being fitted tightly to the central pipe (11) along the axial direction, meanwhile the two terminal of the U-shape flow passage linked up with the water distributing aperture (16) and water gathering aperture (17), respectively.

4. The apparatus of claim 1, wherein said first flow unit (8) can also be the flow passage in such a membrane bag: two sides of anion exchange membrane (18) and cation exchange membrane (19) sealed by sealing edge, the third side opening, whole or partial, as the entrance of concentrated water, the last side of the membrane bag being fitted tightly to the central pipe (11) along the axial direction and linked with water gathering aperture (17); water entering the membrane bag through the opening side directly, flowing into the central pipe (11) via water gathering aperture (17), and exiting.

5. The apparatus of claim 1, wherein the conductive crust (6) is wound with metal strip or metal wire.

*6. A helical electrodeionization apparatus comprising: an anion exchange membrane; a cation exchange membrane; an axially extending conduit acting as a water distributing or gathering member; a first electrode; at least one rolled membrane bag formed by positioning an interface between the anion exchange membrane and the cation exchange membrane; a metal member extending about the outside of and separate of said at least one membrane bag to form a second electrode; a first flow unit including a flow passage in said membrane bag and communicating with said conduit along the axial direction; a second flow unit including a flow passage adjacent said at least one membrane bag; and a housing for the foregoing components.*

*7. The apparatus of claim 6 wherein the interface is a net separating wall.*

*8. The apparatus of claim 6, wherein said second electrode comprises a metal strip or metal wire forming a conductive crust.*

*9. The apparatus of claim 6, wherein said first flow unit is arranged to be a flow passage in said at least one membrane bag, said first flow unit includes an anion exchange membrane and a cation exchange membrane, said anion exchange membrane and cation exchange membrane being sealed by a sealing edge to form said membrane bag, said membrane bag including an insulated net-separating wall, an inner wall, an exposed side and an opening side, said insulated net-separating wall positioned in the membrane bag between said anion exchange membrane and said cation exchange membrane, said opening side being fitted tightly to said axially extending conduit along an axial direction, said exposed side being open for influx of concentrated water which is adapted to follow said flow passage into said axially extending conduit along an axial direction via said water distributing or gathering member.*

*10. The apparatus of claim 6, wherein said second electrode is wound with metal strip or metal wire.*

*11. The apparatus of claim 6, wherein said housing comprising an outer crust having a first end and a second end, said housing further comprising a first cover removably coupled to said first end and a second cover removably coupled to said second end.*

*12. The apparatus of claim 6, further comprising a cathode linked with said first electrode and an anode linked with said second electrode.*

*13. The apparatus of claim 6 wherein said at least one rolled membrane bag is at least one set of rolled membrane bags formed by positioning an interface between the anion exchange membrane and the cation exchange membrane.*

*14. A helical electrodeionization apparatus comprising: an anion exchange membrane; a cation exchange membrane; an axially extending conduit acting as a water distributing or gathering member; a first electrode; at least one rolled membrane bag formed by positioning an interface between the anion exchange membrane and the cation exchange membrane; a metal member extending about the outside of said at least one membrane bag to form a second electrode; a first flow unit including a flow passage in said membrane bag and communicating with said conduit along the axial direction; a second flow unit filled with an ion exchange resin and including a flow passage adjacent said at least one membrane bag; and a housing for the foregoing components, wherein said first electrode is said axially extending conduit.*

*15. The apparatus of claim 14 wherein said axially extending conduit is a metal pipe centrally extending within said housing.*

*16. A helical electrodeionization apparatus comprising: an anion exchange membrane; a cation exchange membrane; an axially extending conduit acting as a water distributing or gathering member, a first electrode; at least one rolled membrane bag formed by positioning an interface between the anion exchange membrane and the cation exchange membrane; a metal member extending about the outside of said at least one membrane bag to form a second electrode; a first flow unit including a flow passage in said membrane bag and communicating with said conduit along the axial direction; a second flow unit filled with an ion exchange resin and including a flow passage adjacent said at least one membrane bag; and a housing for the foregoing components, wherein said water distributing or gathering member is a water distributing member and a water gathering member.*

*17. The apparatus of claim 16, wherein said axially extending conduit comprises a slotted side wall and a blocking member defining an upper part and a lower part,*

*wherein said upper part is the water gathering member and said lower part is the water distributing member, said water gathering member having a water gathering aperture in said slotted wall and said water distributing member having a water distributing aperture, said water gathering aperture and said water distributing member being aligned on the same axis.*

*18. The apparatus of claim 16, wherein said first flow unit includes a U-shape flow passage comprised of said anion exchange membrane and said cation exchange membrane, said anion exchange membrane and cation exchange membrane being sealed by a sealing edge to form said membrane bag, said membrane bag including a guide band, an inner wall, and an opening side, said guide band positioned substantially along the middle of said membrane bag and kept fitting close to said inner wall to form said U-shaped flow passage, said opening side fitted tightly to said axially extending conduit along an axial direction, said opening side linked with said water distributing member and said water gathering member.*

*19. A helical electrodeionization apparatus comprising: an anion exchange membrane; a cation exchange membrane; a central pipe acting as a water distributing or gathering member; a first electrode; at least one rolled membrane bag formed by positioning an interface between said anion exchange membrane and said cation exchange membrane; a metal member extending about the outside of and separate of said at least one membrane bag to form a second electrode; a first flow unit including a flow passage in said membrane bag and communicating; with said central pipe along the axial direction; a second flow unit including a flow passage adjacent said at least one membrane bag; and a housing for the foregoing components.*

*20. The apparatus of claim 19 wherein said interface is a net separating wall.*

*21. The apparatus of claim 19, wherein said first electrode is said central pipe.*

*22. The apparatus of claim 19, wherein said water distributing or gathering member is a water distributing member and a water gathering member.*

*23. An electrodeionization apparatus comprising: an anion exchange membrane; a cation exchange membrane; an axially extending conduit acting as a water distributing or gathering member; a first electrode; at least one rolled membrane bag formed by positioning an interface between the anion exchange membrane and the cation exchange membrane; a metal membrane extending about the outside of said at least one membrane bag to form a second electrode; a first flow unit including a U-shaped first flow passage in said membrane bag and communicating with said conduit along the axial direction; a second flow unit including a second flow passage adjacent said at least one membrane bag; and a housing for the foregoing components.*

*24. The apparatus of claim 23, wherein said U-shape flow passage is formed by said membrane bag, said membrane bag including a guide band, an inner wall, and an opening side, said guide band positioned substantially along the middle of said membrane bag and kept fitting close to said inner wall to form said U-shaped flow passage, said opening side fitted tightly to said axially extending conduit along the axial direction, said opening side linked with said water distributing member or said water gathering member.*

*25. An electrodeionization apparatus comprising: an anion exchange membrane; a cation exchange membrane; an axially extending conduit acting as a water distributing or gathering member; a first electrode; at least one rolled membrane bag formed by positioning an interface between the anion exchange membrane and the cation exchange membrane; a metal member extending about the outside of said at least one membrane bag to form a second electrode; a first flow unit including a flow passage in said membrane bag and communicating with said conduit along the axial direction; a second flow unit including a flow passage adjacent said at least one membrane bag; a radially extending water gathering unit communicating with said second flow unit along the radial direction; and a housing for the foregoing components.*

*26. The apparatus of claim 25, wherein said water gathering unit is a water gathering board.*

*27. An electrodeionization apparatus comprising: an anion exchange membrane; a cation exchange membrane; an axially extending conduit acting as a water distributing or gathering member; a first electrode; at least one rolled membrane bag formed by positioning an interface between the anion exchange membrane and the cation exchange membrane, said anion exchange membrane and cation exchange membrane being sealed by a sealing edge opposite said conduit to define said membrane bag; a metal member extending about the outside of said at least one membrane bag to form a second electrode; a first flow unit including a first flow passage in said membrane bag and communicating with said conduit along the axial direction; a second flow unit including a second flow passage adjacent said at least one membrane bag; a water gathering unit separate from said sealing unit and communicating with said second flow unit; and a housing for the foregoing components.*

*28. The apparatus of claim 27, wherein said water gathering unit extends radially from said axially extending conduit.*

*29. An electrodeionization apparatus comprising: an anion exchange membrane; a cation exchange membrane; an axially extending conduit acting as a water distributing or gathering member; a first electrode; at least one rolled membrane bag formed by positioning an interface between the anion exchange membrane and the cation exchange membrane; a metal member extending about the outside of said at least one membrane bag to form a second electrode; a first flow unit including a flow passage in said membrane bag and communicating with said conduit along the axial direction; a second flow unit including a flow passage adjacent said at least one membrane bag; a radially extending water distributing unit communicating with said second flow unit along the radial direction; and a housing for the foregoing components.*

*30. The apparatus of claim 29, wherein said water gathering unit is a water gathering board.*

*31. An electrodeionization apparatus comprising: an anion exchange membrane; a cation exchange membrane; an axially extending conduit acting as a water distributing or gathering member; a first electrode; at least one rolled membrane bag formed by positioning an interface between the anion exchange membrane and the cation exchange membrane; a metal member extending about the outside of said at least one membrane bag to form a second electrode; a first flow unit communicating with said conduit along the axial direction and including a first flow passage for circulating a first fluid in said at least one membrane bag towards said axially extending conduit; a second flow unit adjacent said at least one membrane bag and including a second flow passage for passing a second fluid in a direction substantially along the axial direction; and a housing for the foregoing components.*

*32. The apparatus of claim 31, wherein said first flow passage circulates the first fluid in said membrane bag both away from said axially extending conduit and towards said axially extending conduit.*

* * * * *